(12) United States Patent
Odendall

(10) Patent No.: US 8,457,927 B2
(45) Date of Patent: Jun. 4, 2013

(54) METHOD FOR DIAGNOSING THE FUNCTIONAL RELIABILITY OF A LAMBDA PROBE

(75) Inventor: Bodo Odendall, Lenting (DE)

(73) Assignee: Audi AG, Ingolstadt (DE)

( * ) Notice: Subject to any disclaimer, the term of this patent is extended or adjusted under 35 U.S.C. 154(b) by 330 days.

(21) Appl. No.: 12/815,990

(22) Filed: Jun. 15, 2010

(65) Prior Publication Data

US 2011/0077908 A1 Mar. 31, 2011

(30) Foreign Application Priority Data

Sep. 26, 2009 (DE) .......... 10 2009 030 582

(51) Int. Cl.
- G06F 13/00 (2006.01)
- G06F 3/00 (2006.01)
- G06F 13/10 (2006.01)
- G06F 13/12 (2006.01)

(52) U.S. Cl.
USPC ............ 702/183; 702/182; 702/184; 702/185

(58) Field of Classification Search
USPC .......... 702/24, 34, 45, 183, 184, 185; 60/274, 60/276; 73/1.06
See application file for complete search history.

(56) References Cited

U.S. PATENT DOCUMENTS

| | | | | |
|---|---|---|---|---|
| 5,992,142 | A * | 11/1999 | Pott | 60/274 |
| 6,463,733 | B1 * | 10/2002 | Asik et al. | 60/276 |
| 6,519,930 | B1 * | 2/2003 | Maus et al. | 60/274 |
| 7,418,853 | B2 * | 9/2008 | Odendall | 73/1.06 |
| 7,874,144 | B2 * | 1/2011 | Bruck | 60/285 |
| 2004/0206067 | A1 * | 10/2004 | Birkhofer et al. | 60/273 |

FOREIGN PATENT DOCUMENTS

| | | |
|---|---|---|
| DE | 19722334 A1 | 12/1998 |
| EP | 1724458 A1 | 11/2006 |
| EP | 1734241 A1 | 12/2006 |

* cited by examiner

*Primary Examiner* — Michael Nghiem
*Assistant Examiner* — Felix Suarez
(74) *Attorney, Agent, or Firm* — Novak Druce Connolly Bove + Quigg LLP

(57) ABSTRACT

In the change from lean to rich exhaust gas or vice versa, signals are recorded by a lambda probe and are used to diagnose the functional reliability of this lambda probe. So that special reliability of this procedure is ensured, the change is triggered by an event. The event can be defined by signals of the lambda probe or can be caused by control actions of the operator in the motor vehicle.

5 Claims, 4 Drawing Sheets

METHOD FOR DIAGNOSING THE FUNCTIONAL RELIABILITY OF A LAMBDA PROBE

BACKGROUND OF THE INVENTION

A situation is assumed here in which a catalytic converter in the exhaust gas line to an internal combustion engine has the capacity to store oxygen. In this way the emissions of the system are reduced. If the internal combustion engine releases carbon monoxide to an increased degree, it is oxidized into carbon dioxide with oxygen from the catalytic converter. If the internal combustion engine releases nitrogen oxides to an increased degree, they are reduced, and the remaining oxygen is stored in the oxygen storage system. It is assumed that the capacity to hold and release oxygen is not exhausted. So that this is the case at any time, regulation takes place using a lambda probe which is located downstream of the catalytic converter or at least downstream of a section thereof.

Regulation stands and falls with the functional reliability of this lambda probe. Reliably determining the oxygen storage capacity of the catalytic converter is possible only when the lambda probe is fully functional. To determine the oxygen storage capacity, the exhaust gas line is supplied in alternation with lean and rich exhaust gas. In the process, an almost completely oxygen-free catalytic converter is gradually charged with oxygen until it is almost completely charged; then again the oxygen is almost completely eliminated, etc. Conclusions about the oxygen storage capacity can be drawn on the basis of the signals of the lambda probe. The oxygen storage capacity is determined here based on the measurement of the interval between the change from rich to lean exhaust gas or vice versa on the one hand and the signals of the lambda probe passing through a threshold value on the other hand. If the lambda probe is not completely functional, i.e., aged or poisoned, this threshold value is, however, crossed only later. This could result in an increased oxygen storage capacity being indicated erroneously. Failure to detect a lambda probe that is not fully functional and an oxygen storage system that is not fully functional at the same time should be avoided, or a fully functional oxygen storage system could be erroneously diagnosed by the impaired probe.

The diagnosis of the oxygen storage capacity of the catalytic converter therefore must be preceded by a diagnosis of the functional reliability of the lambda probe.

In DE 2008 023 893, it is described that at least one signal can be used for diagnosis which has been recorded in time by the lambda probe when changing from a lean to a rich exhaust gas or vice versa. It is not necessary to wait for a time interval after the change, but signals that are assigned directly to this change can then be used. The expression "in time when" can include first waiting for a delay time to expire. The delay time begins with the detection of the change by another lambda probe located upstream of the catalytic converter and can extend over 20 to 50 ms. After the delay time expires, signals in a further time interval are then used for diagnosis.

The method from DE 10 2008 023 893 works reliably in most of the settings of the control device which controls the delivery of fuel to the internal combustion engine and therefore the change from lean to rich exhaust gas.

To date there has not been a teaching regarding how it can be induced that under all possible conditions the method for diagnosis of the functional reliability of a lambda probe will work in each instance, using signals recorded by this lambda probe, when changing from rich to lean exhaust gas or vice versa.

Thus, the object of the invention is to make the method from DE 10 2008 023 893 more reliable, i.e., to have it proceed without problems under all possible conditions, even unusual conditions.

SUMMARY OF THE INVENTION

According to the invention, the change is initiated by an event that is not determined or not exclusively determined by a timing interval.

The invention departs from the previous stipulation that the change from lean to rich exhaust gas and vice versa is periodically induced in a time sequence, so that what is important is the stipulation of the perfect period duration so that the method works optimally. Coupling the action of changing to an event yields another degree of freedom in the configuration of the diagnosis method and can subsequently influence its reliability.

In one aspect of the invention, the event is defined by one or more signals recorded by the lambda probe that is to be diagnosed. Then there is direct feedback that can be used for the purposes of regulation which is configured such that the result of the method is a reliable diagnosis. It is a finding of the inventor of this application that this regulation is possible.

The change can be effected, and to a certain extent triggered, especially easily when a threshold value for the lambda probe signal and/or its time derivative is exceeded and not reached. In this aspect, the invention is based on the finding that different chargings of the catalytic converter with oxygen are passed through in a predetermined manner when this is ascertained by regulation based on signals of the lambda probe.

In another aspect of the invention, which is alternative to the indicated triggering, the change to a rich exhaust gas is induced by supply of fuel to the internal combustion engine after a minimum interval of interruption of this supply. Thus, it is awaited until the operator of the motor vehicle takes his foot off the gas pedal so that the internal combustion engine undergoes transition into the coasting state and, to a certain extent, is running extremely lean, specifically is no longer receiving any fuel at all. Then the oxygen storage system is almost completely filled. If diagnosis takes place after the re-supply of fuel, i.e., the operator stepping on the gas pedal, then there are favorable conditions for carrying out a diagnosis for the functional reliability of the lambda probe downstream of the catalytic converter when the signals are to be used in the change to a rich exhaust gas.

In the two indicated alternatives, triggering of the change based on signals of the lambda probe itself on the one hand and awaiting the situation of such a change induced by the operator, on the other hand, one finding underlying the concept of the invention is that the signals recorded during the change in the exhaust gas composition are especially well-suited for diagnosis when the oxygen charging of the catalytic converter has either not reached a predefined lower boundary value and, as a result of the change exceeds it, or vice versa has exceeded a predefined upper boundary value and as a result of the change falls below it. The lower boundary value can be oxygen charging between 5% and 15%, preferably it is between 9% and 11%, specifically, about 10%; and the predefined upper boundary value is between 85% and 95%, preferably between 89% and 91%, specifically, about 90% oxygen charging.

Otherwise, the method described in the earlier application, DE 10 2008 023 893, can be completely carried out.

Depending on the instant of change, a time interval is defined, and the signals that have been recorded in this time interval by the lambda probe are used for diagnosis. The time interval can begin around an estimated and determined passage time after the instant of changing, which the exhaust gas requires for passing through the exhaust gas line; this can be measured, for example, using another lambda probe upstream of the catalytic converter for the lambda probe that is to be diagnosed. The time interval can have a length of at most 50 ms, preferably less than 20 ms.

For diagnostic purposes, a numerical derivative value can be used which includes the time derivative of a voltage signal of the lambda probe at least one instant from the time interval. It can be, for example, the maximum amount of the time derivative in the entire time interval, or even the average amount. Other solutions are likewise possible.

The numerical derivative value alone can be used and, for example, can be compared to a threshold value according to a predetermined criterion by which it is established whether the lambda probe is considered to be functional or not. In the same way, the numerical derivative value can be used jointly with another numerical derivative value to determine a ratio. Then the ratio is compared to a threshold value according to a predetermined criterion by which it is established whether the lambda probe is considered to be functional or not. The other numerical derivative value is determined using at least one signal of the lambda probe to be diagnosed in another time interval which extends prior to the time interval which is determined depending on the instant of the change. The other numerical derivative value can be the minimum amount of the time derivative in another time interval or also the average amount of this time derivative. Other solutions are also possible here.

DETAILED DESCRIPTION OF THE PREFERRED EMBODIMENTS OF THE INVENTION

Figure 1:
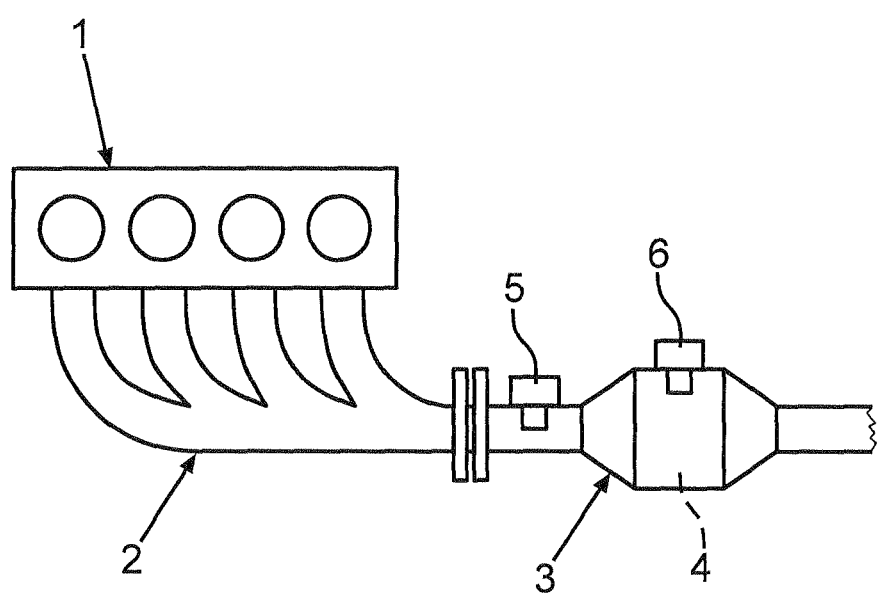
FIG. 1 shows an arrangement in which use of the method according to the invention is expedient, using FIGS. 2a and 2b it is described how the voltage signals (in volts) of a lambda probe located downstream of the catalytic converter (downstream catalytic converter probe) are dependent on the air-fuel ratio lambda (dimensionless) and at the same time can be referenced to the oxygen charging of the catalytic converter, FIG. 3 schematically shows the ideal characteristic of the passage of curves through the measured values of the lambda probe to be diagnosed, depending on the air-fuel ratio downstream of the catalytic converter, this curve enabling the derivative of signals which results in an optimum diagnosis.

FIG. 1 shows a schematic of an internal combustion engine 1 with an exhaust gas line 2. The exhaust gas line 2 comprises an exhaust gas catalytic converter 3 designed, for example, as a three-way catalytic converter, as a NOx storage catalytic converter, or as an active particle filter, and contains an integrated oxygen storage system 4. The exhaust gas line 2 furthermore comprises a lambda probe 5 which is located upstream of the exhaust gas catalytic converter 3 and which is used as a reference probe, as well as a lambda probe 6 which is assigned to the exhaust gas catalytic converter 3 and which is used as a regulating probe.

The lambda probe 6 in this exemplary embodiment is located downstream of the exhaust gas catalytic converter 3. This lambda probe could, however, equally well be located directly in the exhaust gas catalytic converter 3, i.e., downstream of a partial volume of the oxygen storage system 4.

It is assumed below that the exhaust gas of the internal combustion engine 1 can be set with a stipulated precision to a stipulated air-fuel ratio. The functional reliability of the lambda probe 6 is to be determined.

Figure 2A:
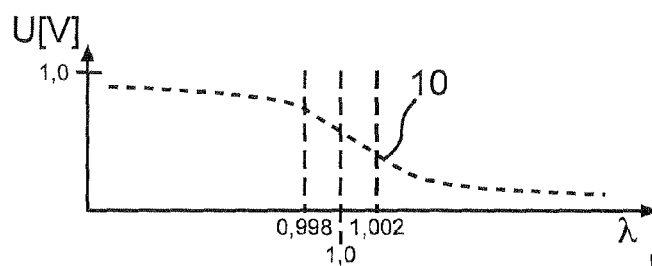
Figure 2B:
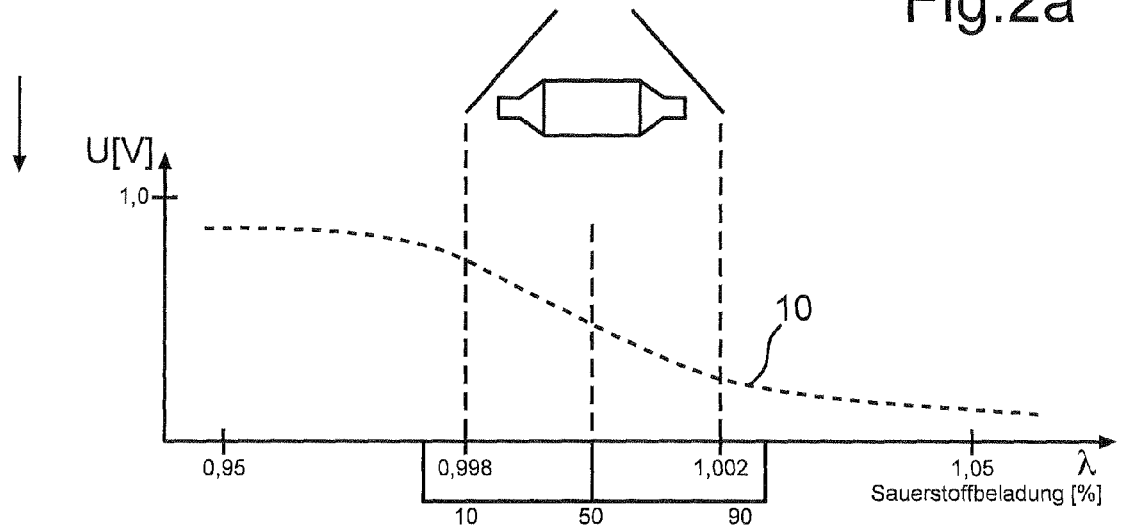

FIGS. 2a and 2b show the voltage signals U (in volts) of the lambda probe 6 depending on the fuel-air ratio lambda (dimensionless) when the lambda probe 6 is fully functional. The characteristic of this lambda probe is that the voltage signals U have a constant value over wide ranges of the air-fuel ratio lambda until reaching into the vicinity of lambda equal to 1.0. In a transition region around lambda equal to 1.0, which is shown enlarged in FIG. 2B, and which extends roughly from lambda equal to 0.998 to lambda equal to 1.002, the signal U drops to a lower threshold value. At higher lambda it remains at this lower threshold value. Therefore, sensitive adjustment to a value lambda equal to 1.0 is possible based on the lambda probe 6; in the regions below lambda equal to 0.998 and above lambda equal to 1.002, clearly adjustment away from the existing lambda is to be made, and in the transition region between lambda equal to 0.0998 and lambda equal to 1.002, the signal of the lambda probe 6 can be used in an especially sensitive manner to set the value of lambda equal to 1.0.

FIG. 2b shows the oxygen charging underneath the scale for lambda. It is assumed here that a value of lambda <1.0 and a value of >1.0 can be set in alternation, such that the oxygen charging fluctuates between 10% and 90%. For a suitable selection of the time behavior therefore conclusions can be drawn regarding the oxygen charging based on the signals of the lambda probe.

For curve 10 it is assumed that a direct reaction of the lambda probe 6 takes place. The oxygen charging is first ignored.

Figure 3:
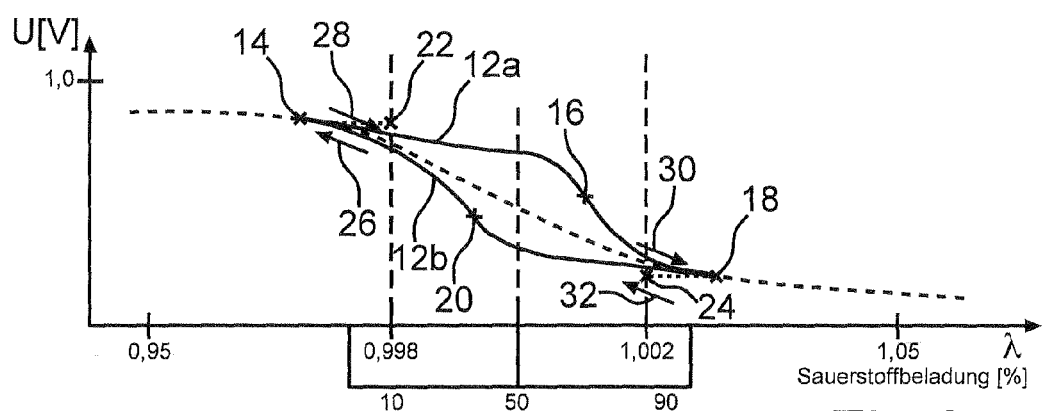

FIG. 3 shows a curve with branches 12a and 12b which takes into account the oxygen charging: If the oxygen charging is increased, the signals of the lambda probe 6 pass through the curve branch 12a from point 14 via point 16 to point 18. If the oxygen charging is then reduced again, the signals of the lambda probe 6 pass through from point 18 from the curve branch 12b via point 20 to point 14.

A change takes place at points 14 and 18: At point 14 there is a change from the supply of rich exhaust gas according to curve branch 12b to the supply of lean exhaust gas according to curve branch 12a. Within a short time interval a lambda deviation 22 occurs. At point 18 there is a change from the supply of lean exhaust gas to the supply of rich exhaust gas; a lambda deviation 24 takes place.

In the changes at points 14 and 18 the (time) derivatives change dramatically: In the curve branch 12b, the signal changes immediately prior to point 14 according to arrow 26, after point 14 in the curve branch 12a according to arrow 28. It can be recognized in this difference that the lambda probe 6 is fully functional. A lambda probe that is not fully functional traverses a different curve. Then there is no lambda deviation 22 either. In exactly the same way there is a change in the derivatives at point 18; see the differences between arrows 30 and 32.

At this point there are curve shapes from which a fully functional lambda probe 6 cannot be clearly diagnosed. For example, according to FIG. 4, modulation of the oxygen charging of the oxygen storage system is carried out here between points 114 and 118 by way of points 116 and 120. It can be recognized that the time derivative downstream of point 114 according to case 128 is negligibly small, in exactly the same way as the time derivative downstream of point 118 according to arrow 132. This also applies for a fully functional lambda probe 6. Therefore this time derivative cannot be used for diagnosis of the lambda probe.

Figure 5:
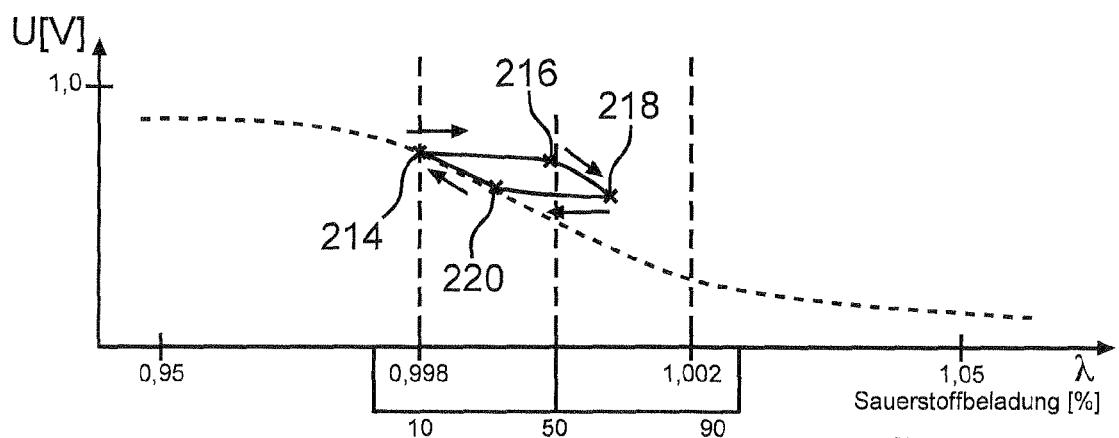
Figure 6:
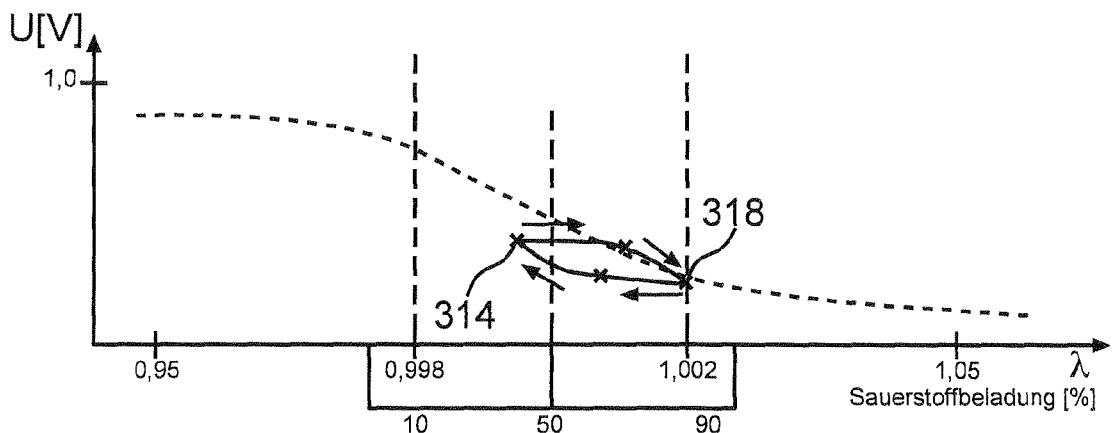

The same applies according to FIG. 5, when the modulation of oxygen charging proceeds such that modulation takes place between points 214 and 218, point 218 corresponding to only fractional oxygen charging; i.e., oxygen charging of 90% is not exceeded there. In the same way, for the curve according to FIG. 6 in passage between points 314 and 318, predetermined oxygen charging of about 40% is always reached; i.e., oxygen charging of only 10% is never reached or always reached.

Figure 7:
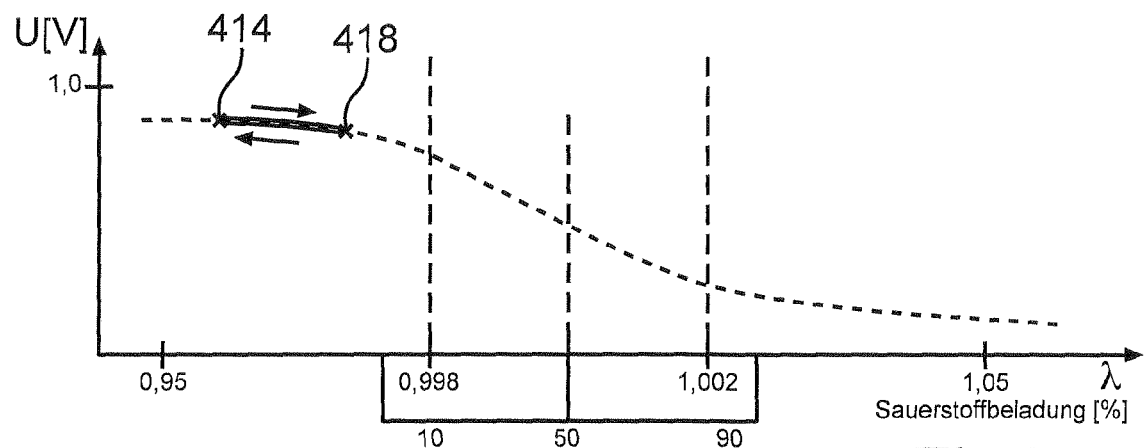
Figure 8:
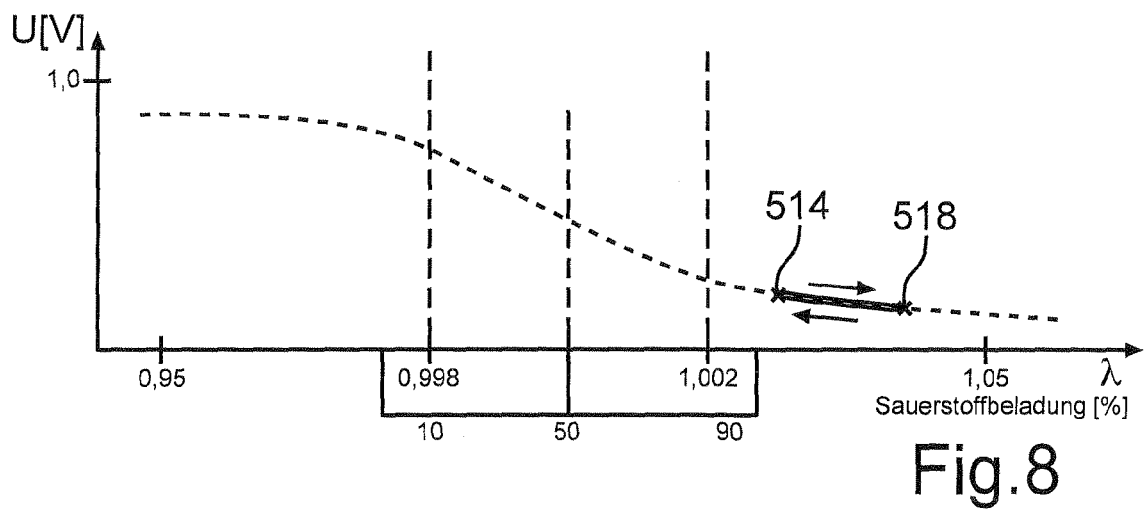

For the curve according to FIG. 7, modulation takes place in the region between points 414 and 418 in which oxygen charging drops distinctly below 10%, even at a higher value at point 418. In exactly the same way according to FIG. 8, oxygen charging is not reached at point 514 and then increased further to point 518.

Figure 4:
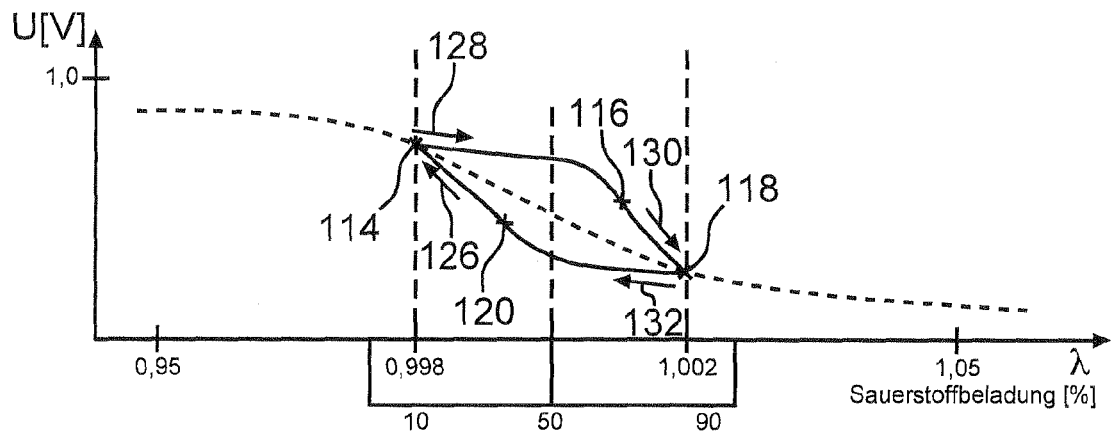
FIGS. 4 to 8 show curves which deviate from the curve of FIG. 3 and which are therefore not ideal.

As already explained for FIG. 4, for FIGS. 5 to 8 as well, nowhere is there the contrast between the derivative upstream of the change from rich to lean or vice versa, as is clear from FIG. 3.

As soon as the curve from FIG. 3 has been determined, the time derivative according to the arrow 28 after the change at point 14, optionally in an interval with a distance to the change, is set into a ratio to the time derivative in an interval before this interval, in particular prior to the entire change, and this ratio can be compared to a threshold value which is chosen such that the lambda probe 6 is considered to be functional when the value is exceeded or, conversely, not reached, otherwise is considered not fully functional.

In order at this point to induce in fact the curve 3 being traversed, a change in the supply between rich and lean exhaust gas and vice versa is triggered, specifically by signals of the lambda probe 6 itself: directly upstream of points 14 and 18, as indicated by arrows 26 and 30, the time derivative of the signals of the lambda probe 6 reaches a threshold value or exceeds it upstream of point 14 or falls below it upstream of point 30. Reaching or exceeding the threshold value then triggers the change in the supply of lean and rich exhaust gas and vice versa. The time derivative can just as easily be used, or both absolute values and also the time derivative can be used at the same time.

It is ensured by the measure of triggering the change in the supply of lean to rich exhaust gas that in fact the curve branches 12a and 12b according to FIG. 3 are traversed and not the curves according to one of FIGS. 4 to 8. Then the above-described ratio can be clearly determined, and it is used to reliably draw conclusions about the functional reliability of the lambda probe 6.

Alternatively, it is possible to reach a point on the other side of point 18 by the supply of fuel being completely dispensed with. This is the case when an operator allows the vehicle to coast. Then there is an exhaust brake by the internal combustion engine 1. As soon as the operator actuates the gas pedal again, point 18 is reached and immediately passed. Then a time derivative according to arrow 32 can be determined (or also an absolute value). This takes place immediately when the gas pedal is actuated, since point 18 is reached in a negligibly short time on the other side of a point.

It is important that after a resting phase of the supply of fuel, the exhaust gas is adjusted to be rich.

It has been shown that it is possible to establish conditions under which conclusions can be reliably drawn about the functional reliability of the lambda probe based on the signals used during a change from lean to rich exhaust gas or vice versa. In this way the method described in DE 10 2008 023 893 attains a rounding-off by its being able to be made reliable under all possible and conceivable conditions.

The invention is based on the finding that oxygen charging should be routed below 10% and directly again should be routed above 10% by the change, or vice versa should be routed above 90% and should be routed directly again below 90% by the change. In these sensitive regions around 10% and 90% oxygen charging, the signals of the lambda probe are especially conclusive for the question of diagnosis of its functional reliability, because these signals are no longer predominantly influenced by the property of the catalytic converter to be able to store and discharge oxygen.

The invention claimed is:

1. A method for diagnosing the functional reliability of a lambda probe which is located in an exhaust gas line in the outflow direction of an exhaust gas emerging from an internal combustion engine downstream of at least one section of a catalytic converter with oxygen storage capacity, the method comprising
   recording, via a processor, at least one signal from the lambda probe during a time interval,
   wherein the time interval depends on an instant of a change from one selected from the group consisting of lean to rich exhaust gas and rich to lean exhaust gas such that directly as a consequence of the change for a fully functional lambda probe the oxygen charging of the catalytic converter exceeds a predetermined lower boundary value or falls below a predetermined upper boundary value,
   wherein the predetermined lower boundary value is oxygen charging of between 5% and 15% and the predetermined upper boundary value is oxygen charging of between 85% and 95%;
   diagnosing the functionality of the lambda probe, via a processor, by comparing a numerical derivative value, which includes the time derivative of a voltage signal of the lambda probe at least one instant from the time interval to a threshold value according to a predetermined criterion.

2. The method according to claim 1, further comprising inducing the change depending on at least one voltage signal recorded by the lambda probe.

3. The method according to claim 1, further comprising inducing the change when a threshold value for the signal of the lambda probe and/or its time derivative is exceeded or not reached.

4. The method according to claim 1, further comprising inducing the change by the supply of fuel to the internal combustion engine after a minimum duration of an interruption of this supply.

5. The method according to claim 1, further comprising:
   determining, via a processor, a ratio from the numerical derivative value with a further numerical derivative value; and
   comparing the ratio to a threshold value according to a predetermined criterion by which it is established whether the lambda probe is considered to be functional or not, the other numerical derivative value being determined using at least one signal of the lambda probe in another time interval which extends prior to the time interval which is determined depending on the instant of the change.

* * * * *